United States Patent [19]
Nobakht

[11] Patent Number: 6,009,120
[45] Date of Patent: Dec. 28, 1999

[54] MULTI-DIMENSIONAL COMBINED EQUALIZER AND DECODER

[75] Inventor: Ramin A. Nobakht, Laguna Niguel, Calif.

[73] Assignee: Rockwell Science Center, Inc., Thousand Oaks, Calif.

[21] Appl. No.: 08/884,271

[22] Filed: Jun. 26, 1997

[51] Int. Cl.[6] .................................................. H03H 7/30
[52] U.S. Cl. ......................... 375/229; 375/232; 375/233; 375/285
[58] Field of Search .................................... 375/229, 233, 375/285, 348, 231, 232, 287; 370/201, 290

[56] References Cited

U.S. PATENT DOCUMENTS

| | | | |
|---|---|---|---|
| 4,084,137 | 4/1978 | Welti | 325/260 |
| 4,597,090 | 6/1986 | Forney, Jr. | 375/261 |
| 4,700,340 | 10/1987 | Gallager | 370/218 |
| 5,031,194 | 7/1991 | Crespo et al. | 375/233 |
| 5,249,200 | 9/1993 | Chen et al. | 375/285 |
| 5,311,547 | 5/1994 | Wei | 375/290 |
| 5,539,774 | 7/1996 | Nobakht et al. | 375/232 |
| 5,692,011 | 11/1997 | Nobakht et al. | 375/233 |
| 5,809,073 | 9/1998 | Ueno | 375/233 |

*Primary Examiner*—Stephen Chin
*Assistant Examiner*—Shuwang Liu
*Attorney, Agent, or Firm*—Akin, Gump, Strauss, Hauer & Feld, L.L.P.

[57] ABSTRACT

A multi-dimensional equalizer/decoder is disclosed for equalizing a channel transmitting electrical pulses corresponding to a plurality of interdependent symbols formed according to the rules of a multi-dimensional code (e.g. block lattice coded modulation). The symbols are received by the equalizer/decoder over multiple symbol (baud) periods because it takes more than one symbol period to receive a minimum decodable number of symbols on the given number of physical channels. The equalizer/decoder employs a preliminary and a final decision device which cooperate with the components of an "equalization layer." A plurality of equalization layers may be used if the symbols are received over a plurality of physical channels. Each equalization layer has first, second, and third, adaptive, feed forward filters, along with appropriately located buffers for collecting decodable groups of the transmitted symbols for group-by-group provision to the decision devices.

The equalizer/decoder beneficially permits equalization of a channel used to transmit a multi-dimensional code block, for example, without requiring that a decodable number of symbols arrive in a single symbol interval. Accordingly, a communication system incorporating the equalizer/decoder may implement a high order, multidimensional code that provides enhanced coding gain even where the number of symbols in the code is so large that, given the physical channels available, it must be transmitted over multiple symbol periods. Where the code permits, the equalizer/decoder may make preliminary decisions regarding a reduced number of symbols while continuing to make final decisions using the maximum number of symbols to achieve maximum code gain.

24 Claims, 3 Drawing Sheets

MULTI-DIMENSIONAL COMBINED EQUALIZER AND DECODER

BACKGROUND OF THE INVENTION

1. Field of the Invention

The present invention relates generally to communication systems employing multi-dimensional codes and, more particularly, provides an equalizer/decoder for adaptive equalization of one or more physical channels transmitting a plurality of symbols which must be decoded as a group but which, due to the number of symbols and available number of physical channels, are transmitted over multiple symbol intervals.

2. Description of Related Art

A generalized communication system includes a transmitter which transmits symbols to a receiver through a communication "channel." Communication systems have been designed to transmit through a wide variety of channels, including conductive metals such as copper, magnetic storage read/write channels, optical fiber, the atmosphere, water, and so on.

There are many modulation techniques which can benefit from the present invention. For background, however, one particularly well known approach is pulse amplitude modulation (PAM). In a PAM-based system, the data symbols are encoded into a sequence of electrical signals, or pulses, having two or more voltage levels. All channels tend to introduce noise and, of particular significance to PAM, introduce amplitude and phase distortion that broadens the pulses and causes intersymbol interference (ISI). The resulting distortion that leads a particular pulse and interferes with past pulses is called precursor ISI and the distortion that follows a particular pulse and interferes with future pulses is called postcursor ISI.

The typical receiver includes an "equalizer" which compensates the electric pulses for the channel distortion. In other words, the equalizer attempts to cancel or remove the ISI. A good overview of an equalizer in a single channel system can be found in my earlier U.S. Pat. No. 5,539,774, entitled "Dual Decision Equalization Method and Device," issued Jul. 23, 1996 and assigned to International Business Machines, Corporation. As explained therein, an equalizer can be linear or nonlinear and can be "trained" or "blind."

Nonlinear equalization, such as decision feedback equalization (DFE), was conventionally used to eliminate postcursor ISI from the present symbol due to previously transmitted and assigned symbols. However, since the decision device is inside the feedback loop the nonlinear DFE is subject to error propagation. Linear equalization does not involve any feedback of the output from the decision device and does not, therefore, suffer from error propagation. For the same reason, however, a linear equalizer does not have an exact knowledge of the previously assigned symbols and, therefore, can only estimate the postcursor ISI. In addition, the linear equalizer has the property of enhancing noise. In the '774 patent, I combined a linear decision-directed equalizer (DDE) with a modified nonlinear decision feedback equalizer (DFE) in order to obtain the benefits, but not the shortcomings in each type of equalizer.

More specifically, the '774 patent proposes a "trainer" system which communicates with a "trainee" system. The terms trainer and trainee were selected because the preferred embodiment implemented a blind equalization scheme that did not require a training sequence. The trainer system comprised a linear decision directed equalizer (DDE) having a feed forward filter and a decision device. The trainee system looked like a conventional decision feedback equalizer having a feed forward filter, a decision device, and a "feedback" filter with the exception that the feedback filter was modified to receive its input from the trainer system rather than the trainee system's decision device.

The '774 Patent is limited in scope because it only addressed "dual decision equalization" in the context of a single channel transmitting a sequence of symbols that are sliced and decoded in a strict symbol-by-symbol sequence. The '774 Patent, therefore, only teaches "dual decision equalization" wherein one symbol from a single symbol sequence is decoded at each symbol interval.

At very high data rates such as that required by the presently evolving standard required by gigabit Ethernet (e.g. a billion bits per second), it is desirable to use a coding scheme which encodes a plurality of data bits into a multi-dimensional constellation of data symbols that provides sufficient redundancy, coding gain and noise immunity. In the context of gigabit Ethernet, for example, the goal is to be able to transmit the electric signals over standard Category 5 unshielded twisted pair (UTP5). UTP5 has eight conductors provided as four twisted pairs which form four parallel communication channels. One potentially desirable coding scheme is a twenty-four dimensional (24D) lattice coding scheme. Assuming that the four pairs in the category 5 UTP carry a signal that is modulated in only one dimension (e.g. a five level PAM signal), it would be necessary to transmit and receive symbols over six baud intervals before the 24D constellation were fully defined.

Unfortunately, however, the equalization apparatus of the '774 Patent does not work with multiple channels (such as the four pairs in UTP) or with a symbol constellation that must be assembled over multiple baud intervals (e.g. six).

There remains a need, therefore, for a communication system which can transmit, receive and equalize a multi-dimensional code that is transmitted over multiple symbol intervals on one or more channels and for a combined equalizer and decoder which can handle multiple symbols received over multiple channels and multiple symbol periods.

SUMMARY OF THE INVENTION

In a first aspect, the invention may be regarded as an adaptive combination equalizer and decoder ("equalizer/decoder") for equalizing one or more physical channels transmitting a plurality of electrical signals corresponding to a plurality of interdependent symbols encoded according to a multi-dimensional code and wherein a minimum decodable number of symbols is transmitted over more than one symbol interval.

The preferred equalizer/decoder comprises means for receiving a plurality of interdependent symbols encoded according to rules of a multi-dimensional code; first feed forward filter means for receiving the plurality of interdependent symbols and outputting a plurality of first symbol samples corresponding to the plurality of interdependent symbols; first means for collecting a first group of the first symbol samples; preliminary multi-dimensional decision means for assigning a plurality of preliminary decision symbols to the plurality of first symbol samples in the first group according to the rules of the multi-dimensional code; second feed forward filter means for receiving the plurality of interdependent symbols and outputting a plurality of second symbol samples corresponding to the plurality of interdependent symbols; second means for collecting a second group of the second symbol samples; third feed forward filter means for receiving the plurality of first decision symbols as inputs and outputting a plurality of third symbol samples; means for combining the second symbol samples with the third symbol samples and outputting a plurality of combined symbol samples; third means for collecting a third group of the combined symbol samples; and final multi-dimensional decision means for assigning a plurality of final decision symbols to the plurality of combined symbol samples in the third group according to the rules of the multi-dimensional code.

In a second aspect, the invention may be regarded as a communication system which incorporates an equalizer/decoder, as described above, and transmits multiples symbols of a high order multi-dimensional code over a given number of physical channels such that it takes multiple symbol periods to transmit a minimum decodable number of symbols. An example of such a system is a gigabit Ethernet system transmits 24 symbols over the four physical channels of UTP-5, such that given one dimensional PAM-5 encoding it takes two symbol intervals to acquire a minimum decodable number (8) of symbols.

The equalizer/decoder uniquely shares a preliminary and final multi-dimensional decision devices among one or more "equalization layers," there being one equalization layer for each physical channel used for transmission.

BRIEF DESCRIPTION OF THE DRAWINGS

The just summarized invention can be best understood with reference to the following description taken in view of the drawings of which.

DETAILED DESCRIPTION OF THE PREFERRED EMBODIMENTS

Figure 1:
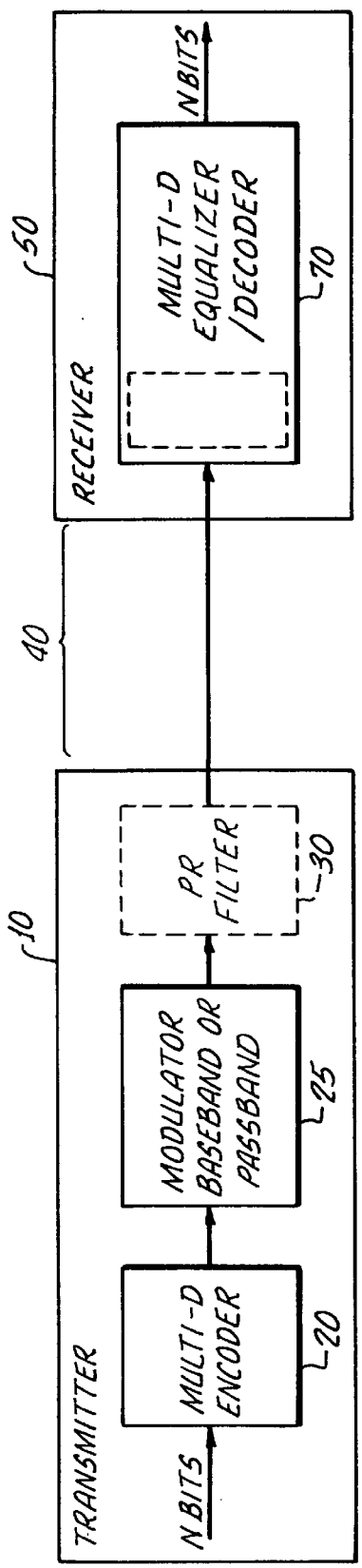
FIG. 1 is a simplified block diagram of communication system wherein N bits are encoded by a multi-dimensional encoder, modulated by a modulator, transmitted over a channel, received by a receiver, and simultaneously equalized and decoded by a multi-dimensional equalizer/decoder according to the present invention. Optionally, the transmitter may include a partial response filter and the equalizer/decoder may include a partial response equalizer portion for removing the ISI introduced by the partial response filter.

FIG. 1 is a simplified block diagram of a general communication system embodying the present invention. As shown, this embodiment comprises a transmitter 10 and a receiver 50 that communicate with one another over a channel 40 which may contain one or more data paths. The transmitter 10 contains a multi-dimensional symbol encoder 20, a modulator 25 which may be either baseband or passband, and an optional partial response filter 30. The receiver 50 contains a multi-dimensional equalizer/decoder 70 according to the present invention.

As is well known, the encoder 20 encodes N bits into a multi-dimensional code which introduces dependencies between signals within a symbol sequence or symbol group in order to increase the immunity to noise by permitting only certain code sequences or code groups. The symbols generated by such a code, therefore, are sometimes called interdependent symbols. The exact code used is not critical to the present invention so, for purposes of simplicity and clarity, no particular code will be described in detail. A good example of a multi-dimensional code with symbol dependency, however, is disclosed in U.S. Pat. No. 4,700,349, entitled "Coded Modulation System," issued to Robert G. Gallager on Oct. 13, 1987, and assigned to Codex Corporation.

Figure 2:
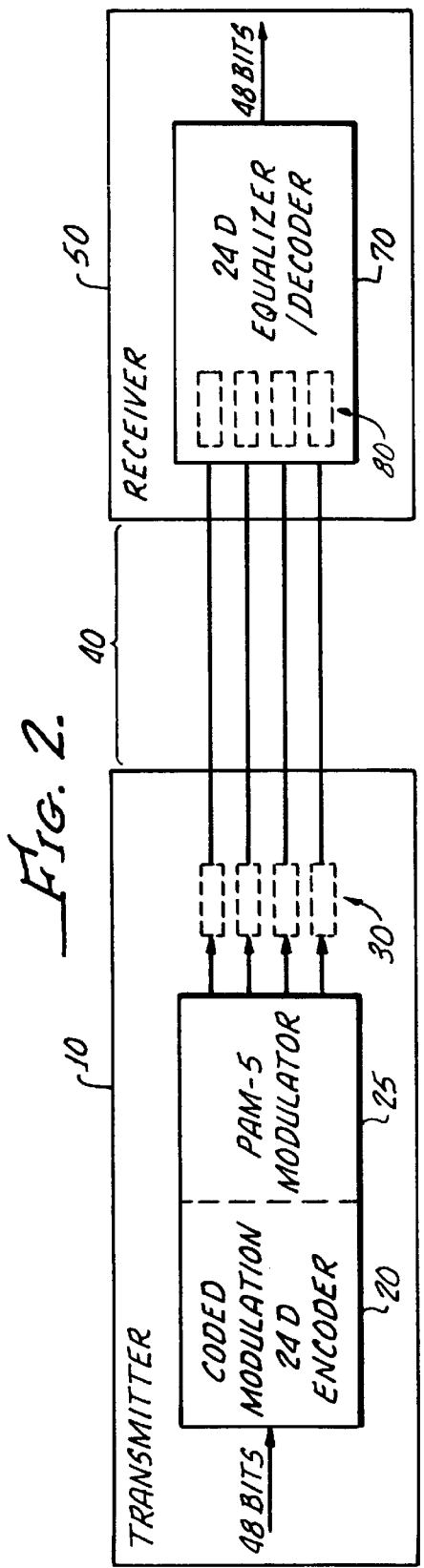
FIG. 2 is a simplified block diagram of a gigabit Ethernet communication system involving 48 data bits that are encoded into a code block having 24 one dimensional code words according to a 24D block code, transmitted over a four pair category 5 UTP channels in six symbol intervals, received by the receiver, and equalized and decoded in full or partial block portions by a 24D multi-dimensional equalizer/decoder according to the present invention.

FIG. 2 shows a more particular embodiment relating to a proposed approach for transmitting data at gigabit speeds over standard Category 5 unshielded twisted pair (UTP) in an Ethernet environment. This system is being disclosed to clarify the operation of the present invention within a particular context, but it should be understood that the present invention is not limited to the specifics of this embodiment.

In FIG. 2, the transmitter 10 and a receiver 50 that communicate with one another over a UTP channel 40 having four data paths. The transmitter 10 contains a 24D encoder 20 and a modulator 25 which collectively implement a coded modulation scheme using PAM-5 baseband modulation, and a plurality of optional partial response filters 30 for spectral shaping. The receiver 50 contains a 24D multi-dimensional equalizer and decoder 70 which, if partial response filters 30 used in the transmitter, also contains corresponding partial response equalizers 80.

In operation, the system of FIG. 2 transmits successive blocks of symbols corresponding to successive groups of forty eight data bits. The 24D symbol encoder 20 transforms each group of forty-eight data bits into a lattice block code having twenty-four symbols from a five level alphabet suitable for Pulse Amplitude Modulation (PAM). The PAM-5 modulator 25 modulates each symbol so that it takes on a value from a set such as $\{+2, +1, 0, -1, -2\}$. Accordingly, there are $5^{24}$ unique symbols in our 24D symbol constellation. The forty-eight data bits encoded into this constellation only form $2^{48}$, or equivalently speaking, $(2^2)^{24}=4^{24}$ different combinations. The outputs of the PAM-5 modulator 25 are input to the partial response filters 30 (optional), and finally are transmitted over the four UTP5 pairs which define the channel 40.

Since the UTP channel 40 has four pairs of conductors, and since the symbols are modulated onto the four pairs using one dimensional PAM signals, it will take six symbol periods, also known as baud periods or modulation periods, to transmit each twenty-four symbol code block. Stated another way, at each successive baud period, the PAM-5 modulator 25 outputs four symbols to the partial response filter 30 which outputs four partial response symbols to the UTP channel 40. After six such baud periods, therefore, the entire 24D code group has been transmitted across the UTP channel 40 as twenty-four symbols.

The partial response filters 30 and UTP channel 40 both contribute to intersymbol interference (ISI). The receiver 50 must remove the known ISI contribution from the partial response filter 30 and the unknown ISI contribution from the UTP channel 40. The contribution from a partial response filter 30 is a known quantity and can be removed with relative ease using a unique partial response equalization technique, discussed below. The UTP channel 40, however, poses a more difficult problem because it adds unknown, varying amounts of noise and distortion.

A conventional receiver removes ISI from the transmitted symbols by using some method of adaptive equalization. As discussed above, however, the known linear or nonlinear equalizers each have certain shortcomings.

Linear equalizers, for example, generally use a feed forward filter that is adapted in conjunction with a decision device such as a slicer. The feed forward filter is typically a finite impulse response (FIR) filter having a predetermined number of taps or adjustable coefficients suitable for a particular design. An error signal is usually generated by comparing the output of the decision device with its input. That error signal is then used to adapt, or adjust, the coefficients of the feed forward filter so that the error is eliminated or minimized according to an appropriate algorithm. Unfortunately, a linear equalizer has no feedback information regarding previous symbols. A linear equalizer has no feedback information and must estimate postcursor ISI and has the added disadvantage of noise enhancement.

Traditional nonlinear equalizers employ a feedback filter, a decision device, and a feedback loop containing a feedback filter which receives its input from the decision device. Due to its feedback knowledge of previously detected symbols, a nonlinear equalizer can eliminate ISI. As with the linear equalizer, the filters are typically FIR filters and an error signal is generated with respect to the decision device and used to adjust the coefficients of both filters. Although it can eliminate postcursor ISI without enhancing noise, a nonlinear equalizer is subject to error propagation because one symbol decision affects subsequent decisions via the feedback filter and coefficient adjustment. A wrong decision, therefore, may cause even more wrong decisions.

The '774 Patent, discussed above, combines linear equalization with nonlinear equalization, but it is not readily adaptable to a multi-dimensional modulation coded scheme. In particular, the '774 Patent discloses a dual decision structure involving a linear "trainer" system and a "trainee" system. The trainee is modified in that the input to its feedback filter is not taken from its decision device (breaking the error propagating feedback loop), but rather from the trainer's decision device. This provides for the elimination of ISI without inviting error propagation. Unfortunately, however, the system disclosed in the '774 Patent operates on only one channel and each of its decision devices must make a decision immediately after receiving a symbol. As such, the system disclosed by the '774 Patent is not suitable for use in a systems like those of FIGS. 1 and 2 which transmit a multi-dimensional block code over multiple baud periods on one or more physical channels.

The invention disclosed herein, however, uniquely implements a multi-dimensional equalizer/decoder that perform decisions relative to a multi-dimensional code that is distributed over "time" and "space". Returning to our system level embodiment of FIG. 2, for example, the present invention makes it possible to equalize the symbols transmitted over the UTP channel 40 even though it carries a 24D block code spread over its four physical channels and over six baud periods.

Figure 3:
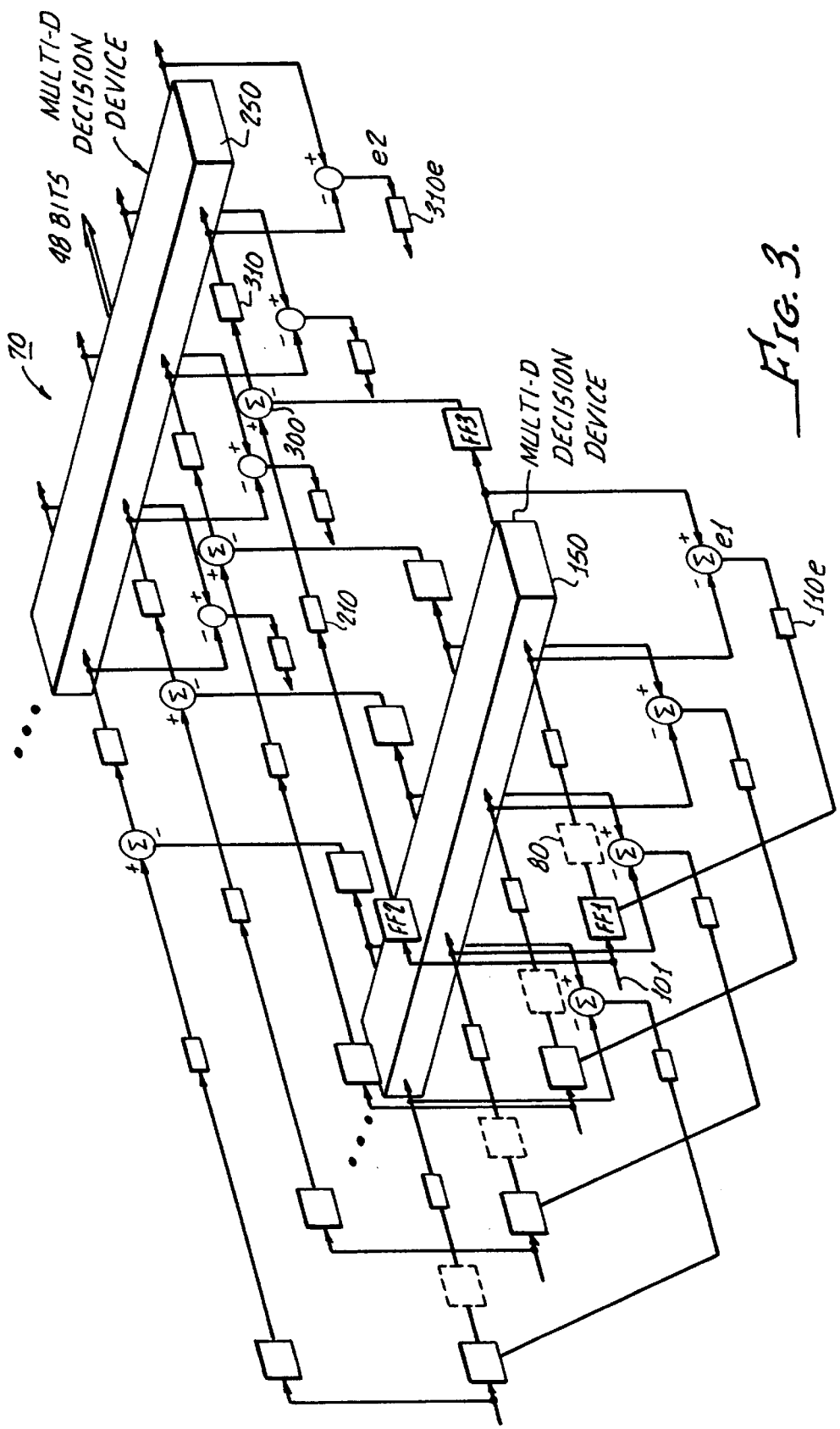
FIG. 3 shows a preferred embodiment of a multi-dimensional equalizer/decoder according to the present invention having four "equalization layers" sharing common multi-dimensional decision devices for use with the four physical channels in the system of FIG. 2.
Figure 4:
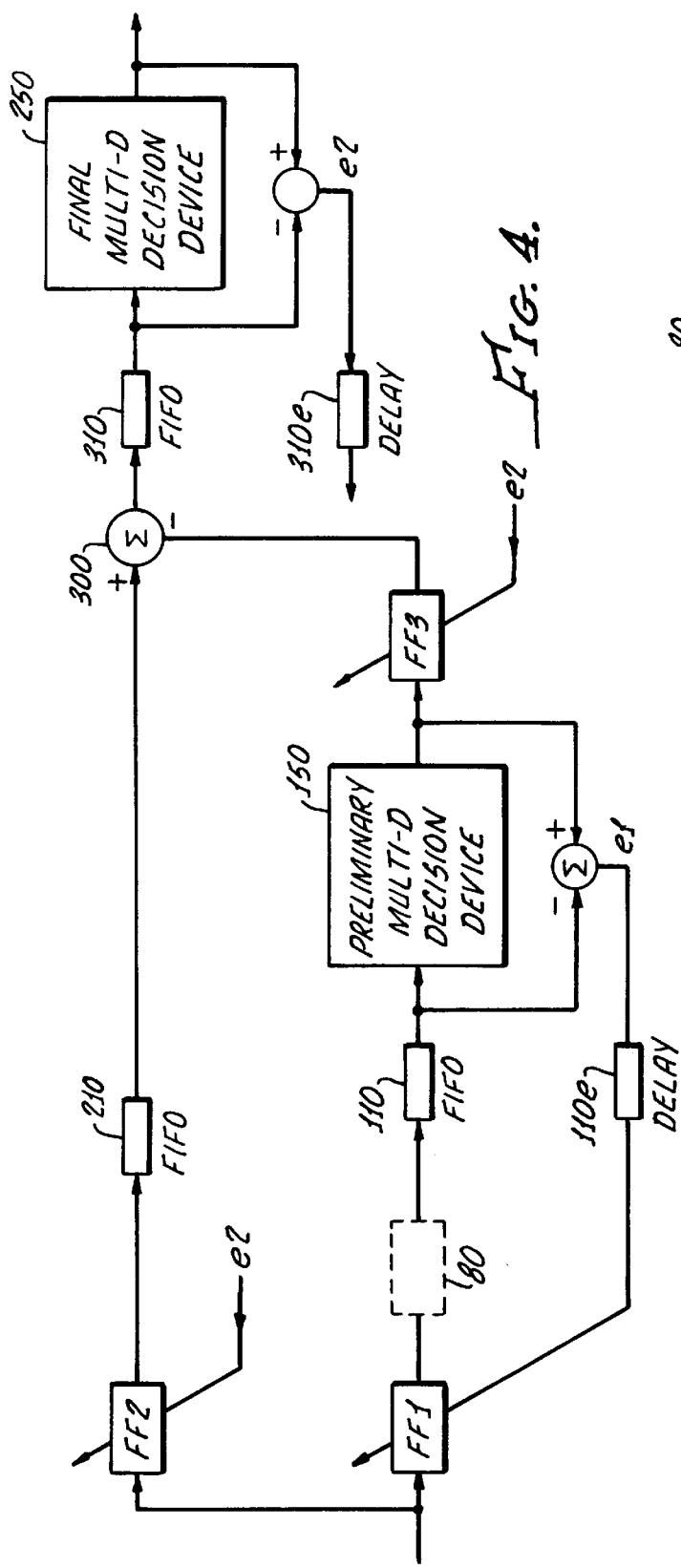
FIG. 4 shows one equalization layer of the multi-dimensional equalizer/decoder of FIG. 3, along with the error signals used to adapt the coefficients of the first, second, and third feed forward filters within the illustrated equalization layer.

FIG. 3 depicts a presently preferred embodiment of a multi-dimensional equalizer/decoder 70 according to the present invention. As shown, preliminary and final multi-dimensional decision devices 150, 250 cooperate with multiple groups of feed forward filters FF1, FF2, FF3 and summers 300 that receive and act upon multi-dimensional encoded symbols transmitted over physical channels and multiple baud intervals. These groups might be called "equalization layers". The groups further provide first, second, and third collecting means 110, 210, 310, and error delay devices 110e, 310e (as shown in FIG. 4) at appropriate locations so that it may receive, equalize, and decode a multi-dimensional code having a minimum decodable portion that arrives over more than one symbol period. The equalizer/decoder of FIG. 3 has four physical channels in accordance with the system of FIG. 2, but as suggested by the ellipses (". . . "), a fewer or greater number of channels may be accommodated in another context without departing from the spirit or scope of the present invention.

The equalizer/decoder 70 has four equalization layers for use in equalizing symbols transmitted over the four twisted pairs of the UTP channel 40 of FIG. 2. The operation of the equalizer/decoder 70, however, can be best understood by initially focusing on the components of one equalization layer, bearing in mind that all equalization layers cooperatively interact with two multi-dimensional decision devices 150, 250 that are common to all equalization layers.

In one equalization layer, the multi-dimensional equalizer/decoder 70 comprises a means for receiving 101 a plurality of interdependent symbols over a plurality of baud periods assembled according to the rules of a multi-dimensional code. In the preferred embodiment, the receiving means 101 simply comprises the signal inputs from the corresponding twisted pair of the UTP channel 40. The equalizer/decoder 70 further comprises a first FIR feed forward filter means FF1 for receiving the plurality of interdependent symbols and outputting a plurality of first filtered symbols, a first means for collecting 110 a "first" group of the first filtered symbols, and a preliminary decision means 150 for assigning a plurality of preliminary decision symbols to the plurality of first filtered symbols in the first group according to the rules of the multi-dimensional code. Each equalization layer also includes a parallel filter branch having a second FIR feed forward filter means FF2 for receiving the plurality of interdependent symbols and outputting a plurality of second filtered symbols, and a second means for collecting 210 the second filtered symbols. Additionally provided are a third FIR feed forward filter means FF3 for receiving the plurality of preliminary decision symbols and outputting a plurality of third filtered symbols, a means 300 for combining the plurality of second filtered symbols with the plurality of third filtered symbols and outputting a plurality of combined symbols, and a third means for collecting 310 the combined symbols. Finally provided is a final decision means 250 which assigns a plurality of final decision symbols to the plurality of combined symbols provided by the third collecting means 310 and preferably, as shown in FIG. 3, decodes the 24D symbols to output a 48 bit data stream.

FIG. 4 shows one of the equalization layers of FIG. 3, with an emphasis on the error signals used to adjust the coefficients of the first, second, and third feed forward filters FF1, FF2, and FF3. The feed forward filters FF1, FF2 could, of course operate on fractional spaced symbol intervals. As shown, the coefficients of the first feed forward filter FF1 are adjusted on the basis of an error signal e1 determined by comparing the output and input of the preliminary decision device 150. The coefficients of the second and third feed forward filters FF2, FF3, on the other hand, are adjusted on the basis of an error signal e2 determined by comparing the output and input of the final decision device 250.

With continued reference to the preferred embodiment of FIG. 4, it can be seen that each equalization layer of the equalizer/decoder 70 includes a plurality of means for collecting symbols 110, 210, and 310, and error delay blocks 110e, 310e. The preferred collecting means are buffers, such as FIFO buffers, but other types of queues may be used with equal operability. Given a 24D code that is shifted in over six symbol intervals, the first collecting means 110 is preferably a six symbol buffer. After all 6 symbols have been collected in the buffer 110 of each equalization layer, they are made available to the preliminary decision device 150 (sequentially at any rate or all at once as a group) which decides all 24 symbols as a group, from the buffers 110 of all four equalization layers. The 6 symbols from the buffer 110 in one equalization layer are also made available to the error summer e1 (sequentially at any rate or all at once as a group) which, based on the 6 corresponding decided symbols output by the preliminary decision device 150, generates six error signals and loads a six symbol delay block 110e (having appropriate initial conditions) for use in sequentially adapting the first feed forward filter FF1 as it receives the next six symbols.

In like fashion, the second buffer 210 is provided at the output of the second feed forward filter FF2 in order to collect six symbols. As best shown in FIG. 3, the decision device 150 spans four equalization layers. Accordingly, through this unique arrangement, once six symbols have been collected by both buffers 110, 210 in each of the equalization layers, the preliminary decision device 150 makes a decision regarding all of the symbols in accordance with the decoding scheme, and then filters those symbols via the third feed forward filter FF3 and combine those filtered symbols, in time sequence, with the symbols in the second buffer 210 via summer 300. At this point, the combined symbols are made available to the final decision device 250 via the third buffer 310. As explained below, the third buffer 310 may be of length zero (i.e. absent) given certain conditions.

As a special case, provided that symbol-by-symbol decisions which do not take advantage of the code gain are acceptably accurate, and depending on channel characteristics, on of the decision devices 150, 250 could be a multi-dimensional device while the other is a symbol-by-symbol device.

In the preferred embodiment, the preliminary decision means 150 can uniquely take advantage of the modular characteristics of the particular 24D code chosen (a characteristic found in many other codes) in order to make suboptional, but acceptable, preliminary symbol decisions using fewer than the maximum possible number of symbols supported by the block code, while the final decision means 250 continues to make optional final decisions using the maximum number of symbols supported by the block code. For example, given a 24D code which is encoded 8 symbols at a time, we will finally decode the code blocks in full-size 24D blocks, but it is possible to preliminarily decode the code blocks in 24D blocks or in 8D blocks. Decoding the symbols within the preliminary decision means 150 in smaller 8D blocks will result in less coding gain in this part of the system. However, so long as the preliminary decision symbols are reasonably accurate, we can reduce complexity and cost while still achieving the maximum available coding gain by decoding the maximum size 24D blocks in the final decision means 250.

In order to tailor the relative decoding rates of the preliminary and final decision devices 150, 250, (e.g. 8D versus 24D) it is necessary to tailor the depth of the first, second and third FIFOs 110,210,310 and of delay blocks 110e, 310e. For example, as mentioned above, we might want to have the preliminary decision device deciding symbols 8D at a time, but have the final decision device deciding symbols 24D at a time. In this particular case, the first and second FIFOs 110, 210 and preliminary error delay block 110e would be 2 symbol intervals deep, whereas the third FIFO 310 and final error delay block 310e would be 6 symbol intervals deep. On the other hand, if the decision devices are decoding at the same rate of 24D symbols at a time, then the first and second FIFOs 110, 210 and both error delay blocks would be 6 symbol intervals deep. In this case, the second FIFOs 210 could handle all 24 symbols to be provided to the final decision device 250, and the third FIFO 310 would be zero length. We can generalize the relationship as follows: if we define D1 and D2 as the respective decoding rates (in symbol intervals) of the preliminary and final decision devices, N as the depth of the first and second FIFOs 110, 210, and M as the depth of the third FIFO 310.

$$\text{If } D1 = D2 \implies \begin{cases} M = 0 \\ N = \text{Rate} \end{cases}$$

$$\text{else} \begin{cases} M = D2 \\ N = D1 \end{cases}$$

As suggested in FIGS. 1 and 2, it may be desirable to provide each physical channel with a partial response filter for spectrally shaping the transmitted signal. The partial response filter essentially introduces a known amount of ISI by combining a predefined amount of a current symbol with a predefined amount of one or more previous symbols according to a partial response polynomial of desired order, i.e. $\alpha + \beta D + \gamma D^2 + \delta D^3$. The presently preferred partial response polynomial being considered for the system of FIG. 2 is the first order polynomial 0.75+.0.25D. Whatever polynomial is chosen, it may be essential to remove the effect of the purposely introduced ISI within the receiver in order to achieve the desired performance.

Figure 5:
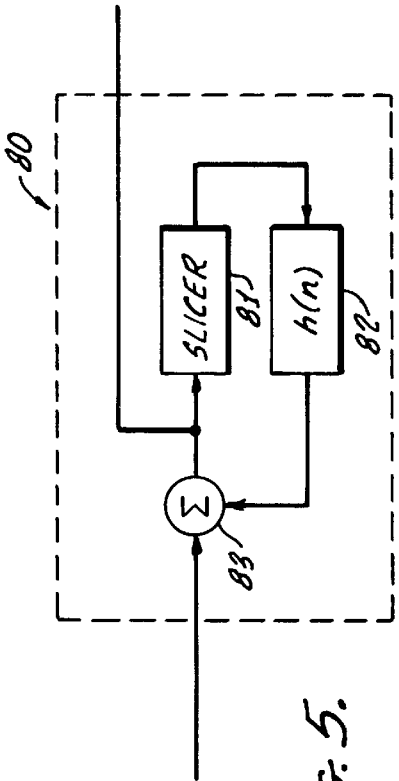
FIG. 5 shows a preferred partial response equalizer 80 for use in the equalizer/decoder 70 of FIGS. 3 and 4.

A unique feature of the present invention is that the equalizer/decoder 70 may be easily modified to further include partial response equalizer portions (fine dashed lines in FIGS. 1, 2, 3 and 4) in order to assist in removing the ISI added by the partial response Tx filter(s) 30. As shown in FIGS. 3 and 4, for example, optional partial response equalizers 80 may be included within the equalizer/decoder 70 for each equalization layer. FIG. 5 shows the preferred partial response equalizer 80. As shown in FIG. 5, the partial response equalizer 80 comprises a symbol-by-symbol decision device 81 (e.g. a slicer), a fixed, non-adaptive, FIR feedback filter 82, and a summer 83. Through this arrangement, each symbol is individually sliced (i.e. decided) and combined with a predefined portion of one or more previous signals (only one in the case of 075+0.25D) via the filter 82 and summer 83, in order to minimize the known ISI contributed by the partial response filters 30 that are implementing the partial response polynomial. The partial response equalizer 80, of course, includes a decision device within a feedback loop and reintroduces the possibility of error propagation to some degree. However, since the feedback filter 82 is fixed and non-adaptive, the error propagation should be insignificant and short lived should it occur.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. An adaptive combination equalizer and decoder for equalizing one or more physical channels transmitting a plurality of electrical signals corresponding to a plurality of interdependent symbols encoded according to a multi-dimensional code and wherein a minimum decodable number of symbols is transmitted over more than one symbol interval, comprising:

means for receiving a plurality of interdependent symbols encoded according to rules of a multi-dimensional code;

first feed forward filter means for receiving the plurality of interdependent symbols and outputting a plurality of first symbol samples corresponding to the plurality of interdependent symbols;

first means for collecting a first group of the first symbol samples;

preliminary multi-dimensional decision means for assigning a plurality of preliminary decision symbols to the plurality of first symbol samples in the first group according to the rules of the multi-dimensional code;

second feed forward filter means for receiving the plurality of interdependent symbols and outputting a plurality of second symbol samples corresponding to the plurality of interdependent symbols;

second means for collecting a second group of the second symbol samples;

third feed forward filter means for receiving the plurality of first decision symbols as inputs and outputting a plurality of third symbol samples;

means for combining the second symbol samples with the third symbol samples and outputting a plurality of combined symbol samples;

third means for collecting a third group of the combined symbol samples;

final multi-dimensional decision means for assigning a plurality of final decision symbols to the plurality of combined symbol samples in the third group according to the rules of the multi-dimensional code.

2. The adaptive combination equalizer and decoder of claim 1 wherein the means for receiving a plurality of interdependent symbols comprises a plurality of physical channels.

3. The adaptive combination equalizer and decoder of claim 2 wherein the means for receiving a plurality of interdependent symbols comprises a plurality of equalization layers equal in number to the plurality of physical channels.

4. The adaptive combination equalizer and decoder of claim 3 wherein all of the equalization layers share the preliminary and final multi-dimensional decision means but wherein each equalization layer has its own first feed forward filter means, first collecting means, second feed forward filter means, second collecting means, third feed forward filter means, combining means, and third collecting means.

5. The adaptive combination equalizer and decoder of claim 1 wherein the multi-dimensional code is a multi-dimensional block code.

6. The adaptive combination equalizer and decoder of claim 5 wherein each code block of the multi-dimensional block code comprises 24 symbols.

7. The adaptive combination equalizer and decoder of claim 1 wherein the preliminary multi-dimensional decision means operates on a reduced number of decodable symbols for reducing complexity and cost and wherein the final multi-dimensional decision means operates on a maximum number of decodable symbols for providing maximum code gain.

8. The adaptive combination equalizer and decoder of claim 7 wherein the first and second groups collected by the first and second collecting means comprise a reduced number of decodable symbols and wherein the third group collected by the third collecting comprises a maximum number of decodable symbols.

9. The adaptive combination equalizer and decoder of claim 1 wherein the preliminary and final multi-dimensional decision means operate on a maximum number of decodable symbols.

10. The adaptive combination equalizer and decoder of claim 9 wherein the first and second groups collected by the first and second collecting means comprise a maximum number of decodable symbols and wherein the third group collected by the third collecting comprises zero symbols.

11. The adaptive combination equalizer and decoder of claim 1 wherein the first and second collecting means are FIFO buffers of size N and wherein the third collecting means is a FIFO buffer of size M.

12. The adaptive combination equalizer and decoder of claim 11 wherein the preliminary and final multi-dimensional decision means decode symbols at the same decoding rate and wherein the size M of the third collecting means is zero.

13. The adaptive combination equalizer and decoder of claim 11 wherein the preliminary multi-dimensional decision means decodes symbols at a reduced decoding rate and the final multi-dimensional decision means decodes symbols at a maximum rate, wherein the size M and size N are both nonzero, and wherein M>N.

14. The adaptive combination equalizer and decoder of claim 1 wherein the first collecting means is separate from the preliminary multi-dimensional decision means.

15. The adaptive combination equalizer and decoder of claim 1 wherein the third collecting means is separate from the final multi-dimensional decision means.

16. The adaptive combination equalizer and decoder of claim 1 wherein the first, second, and third feed forward filter means are finite duration impulse response filters with adjustable coefficients.

17. The adaptive combination equalizer and decoder of claim 16 further comprising means for adjusting the adjustable coefficients of the first, second, and third feed forward filter means.

18. The adaptive combination equalizer and decoder of claim 16 wherein the means for adjusting the coefficients of the first feed forward filter means comprises means for outputting preliminary error signals determining errors between the input and output of the preliminary multi-dimensional decision means and wherein the means for adjusting the coefficients of the second and third feed forward filter means comprises means for outputting final error signals by determining errors between the input and output of the final multi-dimensional decision means.

19. The adaptive combination equalizer and decoder of claim 16 further comprising first and second delay block devices for respectively receiving and sequentially using the preliminary and final error signals to adjust the coefficients of the first, second, and third adaptive filters in time sequence with subsequent symbols.

20. An adaptive combination equalizer and decoder for equalizing one or more physical channels transmitting a plurality of electrical signals corresponding to a plurality of symbols that are encoded according to a multi-dimensional code so as to be interdependent, comprising:

means for receiving a plurality of interdependent symbols encoded according to rules of a multi-dimensional code;

first feed forward filter means for receiving the plurality of interdependent symbols and outputting a plurality of first symbol samples corresponding to the plurality of interdependent symbols;

preliminary decision means for assigning a plurality of preliminary decision symbols to the plurality of first symbol samples;

second feed forward filter means for receiving the plurality of interdependent symbols and outputting a plurality of second symbol samples corresponding to the plurality of interdependent symbols;

third feed forward filter means for receiving the plurality of first decision symbols as inputs and outputting a plurality of third symbol samples;

means for combining the second symbol samples with the third symbol samples and outputting a plurality of combined symbol samples; and final decision means for assigning a plurality of final decision symbols to the plurality of combined symbol samples, wherein at least one of the preliminary decision means and the final decision means is a multi-dimensional decision means for assigning a plurality of decision symbols to a plurality of symbol samples forming a group based on the interdependency between the plurality of symbol samples in the group.

21. The adaptive combination equalizer and decoder of claim 20 wherein the means for receiving a plurality of interdependent symbols comprises a plurality of physical channels.

22. The adaptive combination equalizer and decoder of claim 21 wherein the means for receiving a plurality of interdependent symbols comprises a plurality of equalization layers equal in number to the plurality of physical channels.

23. The adaptive combination equalizer and decoder of claim 22 wherein all of the equalization layers share the multi-dimensional decision means but wherein each equalization layer has its own first feed forward filter means, second feed forward filter means, third feed forward filter means, and combining means.

24. The adaptive combination equalizer and decoder of claim 20 wherein the multi-dimensional code is a multi-dimensional block code.

* * * * *